A-A

United States Patent Office 3,457,462
Patented July 22, 1969

3,457,462
MOBILE DISTRIBUTION BOX FOR CONTROLLING ELECTRIC MOTORS OF MACHINES AND MECHANISMS IN EXPLOSION HAZARDOUS PREMISES
Gennady Georgievich Gargala, bulvar Shevchenko, 77-a, kv. 23; Alexandr Vasilievich Kozlov, ulitsa Artema, 80-a, kv. 12; Alexandr Porfirievich Kotlyarevsky, bulvar Shevchenko, 71, kv. 18; Vitaly Ivanovich Koshman, bulvar Shevchenko, 77, kv. 25; Svyatoslav Semenovich Nedosekov, bulvar Shevchenko, 71, kv. 15; Mikhail Ilich Posternak, bulvar Shevchenko, 79, kv. 12; Jury Fedorovich Sameljuk, bulvar Shevchenko, 77-a, kv. 5; and Valentin Alexeevich Khorunzhy, ulitsa Artema, 79, kv. 3, all of Donetsk, U.S.S.R.
Filed Mar. 14, 1967, Ser. No. 622,972
Int. Cl. H02b 1/08, 1/20, 1/12
U.S. Cl. 317—99                                    6 Claims

ABSTRACT OF THE DISCLOSURE

A mobile distribution box for controlling the electric motor of machines and mechanisms in explosion-hazardous environments wherein electrical equipment is positioned in removable units and each unit accommodates a set for controlling at least one current collecting device. Flame-proof enclosures accommodating connecting wires and bus bars and equipped with quick opening covers are mechanically interconnected and communication between the enclosures is effected via ports. Each enclosure is provided with the removable units. There is at least one inlet box for connection to the mains and a common disconnector is located in a separate chamber in one of the enclosures.

The invention relates to mobile distribution boxes for use in controlling the electric motors of machines and mechanisms employed in explosion-hazardous situations and more particularly to mobile distribution boxes for controlling the electric motors of face machines and equipment at winning districts of collieries as well as for controlling mining machines, sets of complete face equipment and coal plows.

There are known at the present time three types of the distribution boxes for controlling the electric motors of machines and mechanisms in explosion-hazardous environments which are as follows:

(1) Distribution boxes consisting of independent flame-proof units placed in line and rigidly interconnected on a common frame ("Wallstone Engineering," Metropolitain Wickers, Great Britain, "Siemens-Schuckert," German Federal Republic, and others);

(2) A distribution box consisting of independent flame-proof units spaced in several rows in a heightwise fashion, French Patent No. 1,188,193 dated Sept. 21, 1959);

(3) Distribution boxes and magnetic stations accommodated in independent flame-proof enclosures of a rectangular shape.

The first type distribution boxes have the following disadvantages: they are of considerable length, bulky and therefore inconvenient for transportation which is particularly appreciable when a great number of current-collecting devices is controlled; mutual electrical interlocking between separate contactors (feeders) is hindered, with this being particularly appreciable during control of automated sets of equipment and assemblies; and the great weight of the arrangement.

The distribution boxes of the second type can be of small length due to an increase of its height dimensions but this is not always acceptable for collieries.

The distribution boxes of the third type are of small dimensions but due to flame-proof requirements they should have thick-walled enclosures and therefore their weight is considerable.

The existing distribution boxes of the third type manufactured, for example, by Siemens-Schuckert, have a limited field of application i.e. provided with an equipment assembly intended for controlling only one or two definite sets of machines and mechanisms.

An object of the present invention is to eliminate the aforementioned disadvantages.

A principal object of the invention is to provide a mobile distribution box for controlling systems of machines and mechanisms having a great variety of current-collecting devices with length and height of the box being minimized and providing for a maximum possible unification of its design by application of standard units.

The above object is achieved due to the fact that in the distribution box of the invention for controlling the electric motors of machines and mechanisms in explosion-hazardous situations and consisting of electrical equipment accommodated in flame-proof enclosures, the electrical equipment is placed in removable units, each having electrical equipment assemblies for controlling one or several current-collecting devices and installed in enclosures (one unit per each enclosure), with all enclosures being mechanically interconnected and in communication through ports designed for accommodating therein connecting wires and bus bars, one of the enclosures, except said unit, being provided with one or several inlet boxes for connection to the mains and a common interlock disconnector housed in a separate chamber of the same enclosure.

Moreover, apart from the inlet boxes and the interlock disconnector, one of the enclosures carries an automatic circuit breaker electrically connected to the equipment of all enclosures by means of conductors placed in the ports through which separate enclosures are in communication.

All enclosures of the distribution box are installed and secured on skids equipped with detachable carriages having wheels, with each unit of the electrical equipment being essentially a vertical longitudinal panel travelling over the guides along the enclosure axis, and the elements of the electrical equipment being arranged on both sides of the panel.

Moreover, the vertical longitudinal panel of the unit is rigidly coupled with a transverse panel provided with electric contacts and fixtures for centering the panel with the contact panel accommodated in the enclosure and provided with a floating coupling.

Locks of the quick-opening covers of the enclosures are interlocked with the disconnector shaft which in turn is mechanically interlocked with the driving shaft of the automatic circuit breaker.

Additional objects and advantages of the invention will become more readily apparent to persons skilled in the art from the following detailed specification and accompanying drawings, wherein.

Figure 1:
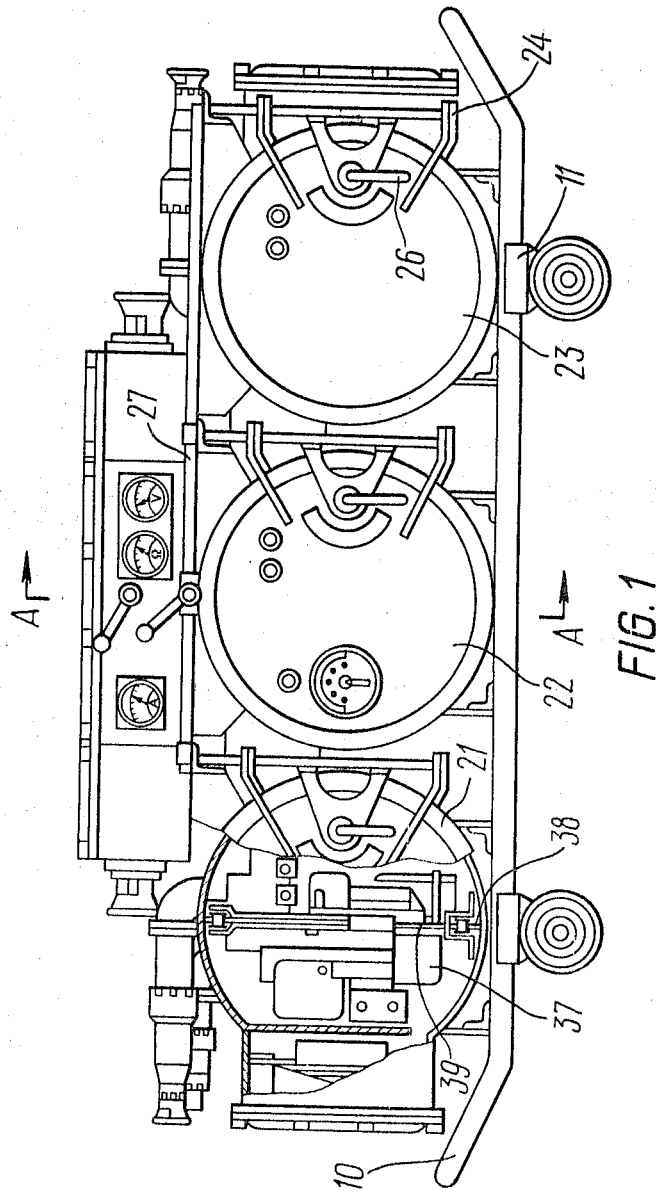
FIG. 1 is an elevational view partly in cross-section of a mobile distribution box according to the invention for controlling the electric motors of machines and mechanisms in explosion-hazardous situations.
Figure 2:
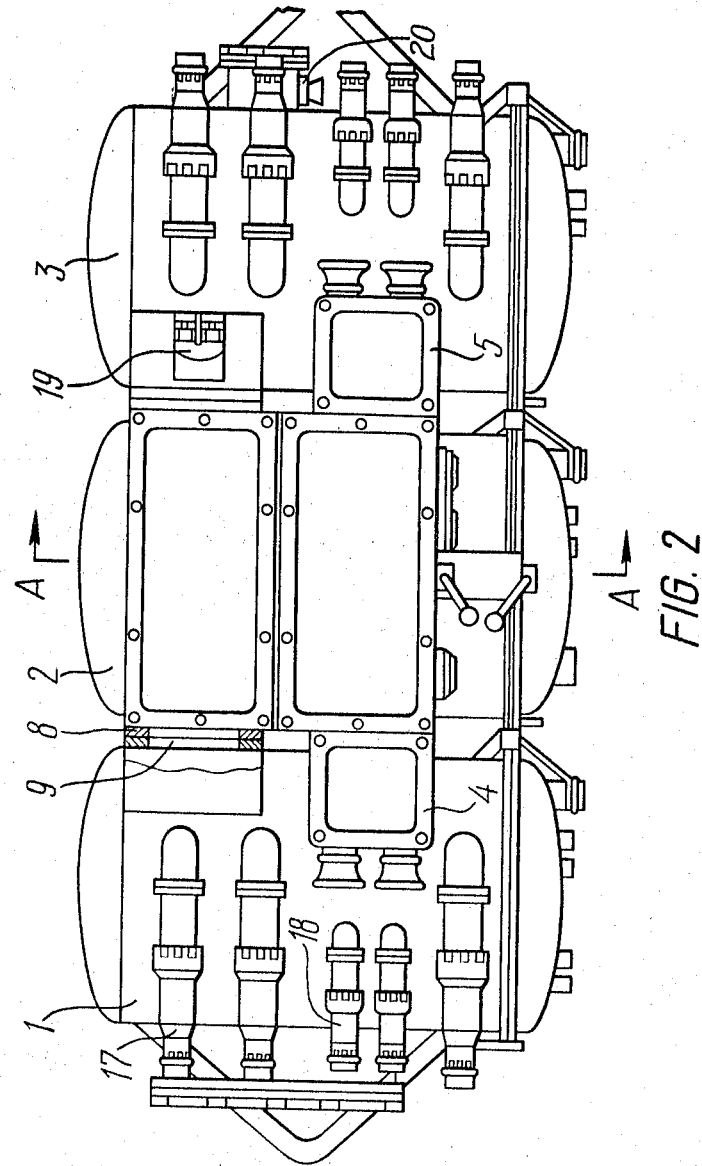
FIG. 2 is a top plan view of the distribution box shown in FIG. 1.
Figure 3:
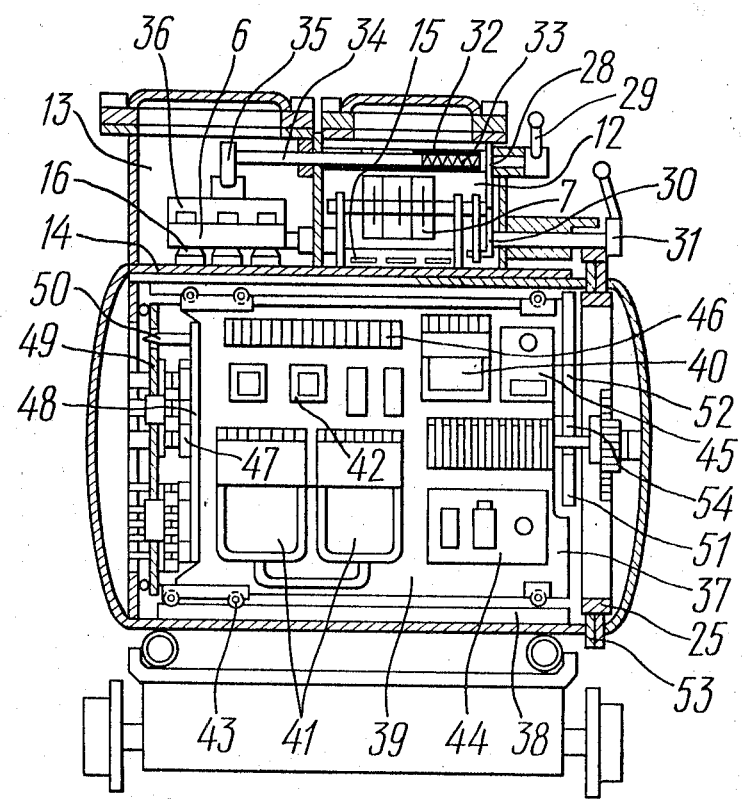
FIG. 3 is a sectional view of the distribution taken along line A—A of FIG. 1, the view looking in the direction of the arrows.
Figure 4:
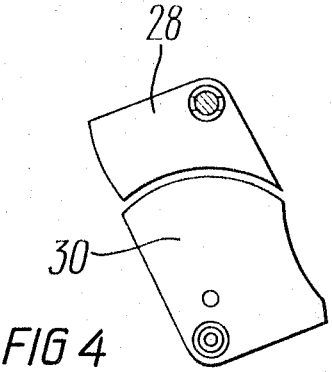
FIG. 4 is a fragmentary diagrammatic view illustrating the mechanical interlocking of the automatic circuit breaker with the disconnector of the distribution box.

The mobile distribution box consists of three interconnected cylindrical enclosures or shells 1, 2 and 3 of a welded type made of sheet steel and each enclosure incorporates an electrical equipment assembly intended for controlling one or several current-collecting devices. In addition, the enclosure 2 contains components common for the entire distribution box, namely inlet boxes 4 and 5 for connection to the mains, an automatic circuit breaker 6 provided with a remote deactivating coil and a disconnector 7.

The cylindrical enclosures 1, 2 and 3 are interconnected by means of rectangular flanges 8 and communication therebetween is effected through ports 9 in the flanges 8. The enclosures 1, 2 and 3 thus connected constitute a rigid flame proof body for the distribution box. The separation of the distribution box body into independent enclosures makes its design more convenient for manufacturing purposes.

Thus, for example, the mobile distribution box may be easily caused to operate with a smaller (or greater) number of controlled current-collecting devices. To this end, it is sufficient to increase (or decrease) the number of enclosures and consequently the electrical equipment units enclosed therein. The cylindrical shape of the enclosures is for better manufacturing and diminishing the weight of the assemblage.

The enclosures 1, 2 and 3 are installed and secured on skids 10 fabricated from steel tubes whereby the distribution box is capable of movement in the longitudinal and transverse directions of the floor or other supporting surface. Moreover, the skids serve as a foundation plate thereby increasing the rigidity of the distribution box. The skids are provided with detachable carriages 11 equipped with wheels for enabling the distribution box to travel along rails.

Chamber 12 of an interlock disconnector and chamber 13 of an automatic circuit breaker are located in the upper portion of the enclosure 2 and are separated from the inner chamber by an explosion-proof partition 14. The inlet boxes 4 and 5 are symmetrically adjacent to and extend from either side to the chamber 12 and provide for the passage of cables from any side.

The chamber 12 accommodates tandem bus bars 15 interconnected by means of terminals whereby one of the inlet boxes may be used to connect to the mains, while the other, to connect an additional tandem load. The voltage is supplied from the chamber 12 through the bus bars to the chamber 13.

The voltage is fed from the automatic circuit breaker 6 to the enclosures 1, 2 and 3 through tandem clamps 16 by means of conductors or bus bars extending through the ports 9. To connect the cables extending to the controlled current-collecting devices provisions are made for plug type leads 17 and 18.

Plug type leads 19 and 20 are designed for connecting control and warning circuits. Covers 21, 22 and 23 which provide access to the independent enclosures 1, 2 and 3 respectively are furnished with quick-acting mechanisms. Each of the covers is suspended by hinges 24 and is equipped with a lock ring 25, with each cover being removed and installed in place by means of a lever 26 which serves to turn the locking mechanism.

The covers 21, 22 and 23 are interlocked with the disconnector 7 by means of a bar 27 so that the covers cannot be opened with the disconnector 7 engaged and, the disconnector cannot be engaged if at least one of the covers is open.

The disconnector 7 can be disengaged only with the automatic circuit break deactivated which is possible due to a mechanical interlocking effected by means of a sector 28 coupled to a shaft and a lever 29 for activating the automatic circuit breaker 6, and a sector 30 coupled with a shaft and a lever 31 for engaging the disconnector 7.

The driving shaft of the automatic circuit breaker 6 is provided with a telescopic system consisting of a tubular portion 32, a spring 33 and a rod 34 equipped with a fork 35. Due to such design, the rod 34, together with the fork 35 can be inserted into the tubular portion 32, thus providing access to the automatic circuit breaker 6 with this being needed for removing cover 36 of the circuit breaker. The electrical equipment arranged in the enclosures 1, 2 and 3 is located in removable units 37, with there being one unit per each enclosure. The units 37 are mounted on standard interchangeable panels and differ only in sets of electrical equipment. This makes it possible with the same enclosures to perform a great number of various modifications of the mobile distribution box.

Due to the fact that all units are similar in design the following is a description of one unit only. The removable unit 37 is a longitudinal vertical panel 39 travelling over guides along the enclosure axis, and with contactors 40 and 41, control equipment and protection equipment 43 being arranged on either side of the panel.

The equipment for controlling one contactor and, consequently, an outgoing feeder, is housed in separate units namely, unit 44 for a reversible current-collecting device, and unit 45 for non-reversible current-collecting device. The units 44 and 45 are of a quick-removable design. The removable units 37 are provided with terminal sets 46 required for various switching and mutual electric interlockings between the separate contactors 40 and 41. The electrical connection of the removable unit 37 with the other portion of the mobile distribution box is by butt contacts 47 located on a transverse panel 48 which is rigidly coupled with the longitudinal vertical panel 39.

The contacts 47 engage the contacts of a panel 49 installed in the enclosure when the unit is inserted to its limit inside the enclosure. The centering of the contacts 47 is effected by pins 50 arranged on the panel 48 and entering into holes of the contact panel 49 arranged in the enclosure and having a floating coupling. The effort required for pressing the contacts is obtained by means of a lever-and-pressure mechanism 51 coupled with the vertical panel 39 of the unit 37 through a shaft 52. As the unit is inserted inside the enclosure, the upper edge of an annular flange 53 of the enclosure serves as a point of support for the upper end of the mechanism 51. With the unit thus pressed it is fixed in position by means of a catch 54.

The current-collecting devices are controlled either from the control panel or from separate control stations. Application of the present distribution box for supplying power to colliery districts will ensure maneuverability and proper mounting of the distribution boxes, increase safety in operation and create favorable conditions for the maintenance of colliery electrical equipment.

To meet the requirements of industry in different modifications of the distribution box, the manufacturing plant may manufacture one or two embodiments of the flame proof body consisting of two or three enclosures and several embodiments of interchangeable removable units of electrical equipment (for example, about 10). The application of the present distribution box instead of separate flame proof units assembled in a distribution box, is economically advantageous, since the prime and operating costs of the distribution box are substantially reduced.

The reduction in cost of the distribution box is possible due to the following:

The application of several enclosures of the body instead of a great number of enclosures of independent flame proof units (one enclosure of the proposed arrangement replacing several independent flame proof units), the number of expensive quick-opening covers being thus substantially reduced; use of one common disconnector instead of several disconnectors arranged in independent units; application of one common mechanical interlocking provided with covers; use of one common lead-in assembly; and the reduction of the number of removable units of the electrical equipment, with each such unit standing for several removable units of independent electrical equipment.

This invention is not to be confined to any strict conformity to the showings in the drawings but changes or modifications may be made therein so long as such changes or modifications mark no material departure from the spirit and scope of the appended claims.

What we claim is:

1. A mobile distribution box for controlling the electric motors of machines and mechanisms for use in explosion-hazardous environments, comprising a plurality of cylindrical flame proof shells arranged in side by side relationship, means mechanically interconnecting said shells in such relationship, said interconnecting means having ports therein for providing communication between said shells, a movable base to which said interconnected shells are secured, removable units, each unit having electrical equipment assemblies for controlling at least one current collecting device, there being at least one unit positioned ni each shell, connecting wires and bus bars accommodated in said ports, one of said shells being provided with at least one inlet box for connection to mains, said one shell having a separate chamber, and a common interlock disconnector located in said separate chamber.

2. The mobile distribution box according to claim 1, wherein one of said shells is provided with an automatic circuit breaker electrically connected to the electrical equipment assemblies of all of said shells by means of conductors positioned in said ports.

3. The mobile distribution box according to claim 1, wherein said movable base includes skids fitted with wheeled carriages.

4. The mobile distribution box according to claim 1, wherein each removable unit comprises a vertical longitudinal panel sliding over guides provided along the axis of said shell and accommodating on either side thereof the components of said electrical equipment assemblies.

5. The mobile distribution box according to claim 4, including a transverse contact panel positioned in said shell, and said vertical longitudinal panel being rigidly connected to a transverse panel provided with electrical contacts and fixtures serving to center said transverse panel with the contact panel having a floating coupling.

6. The mobile distribution box, according to claim 2, including quick-opening covers for the shells, said covers being mechanically interlocked with one another and with a shaft for said disconnector and said disconnector being mechanically interlocked with a driving shaft for the automatic circuit breaker.

References Cited

UNITED STATES PATENTS

| | | | |
|---|---|---|---|
| 2,851,549 | 9/1958 | Keller et al. | |
| 3,002,129 | 9/1961 | Mueller | 317—103 |
| 3,188,413 | 6/1965 | Netzel | 317—103 XR |

LEWIS H. MYERS, Primary Examiner

J. R. SCOTT, Assistant Examiner

U.S. Cl. X.R.

317—103